June 21, 1960 W. C. WETZEL 2,942,255
HORN FRAME CONSTRUCTION
Filed Dec. 15, 1958 3 Sheets-Sheet 1

INVENTOR.
WILLIAM C. WETZEL
BY
Falvey, Souther & Stoltenberg
ATTORNEYS

June 21, 1960 W. C. WETZEL 2,942,255
HORN FRAME CONSTRUCTION
Filed Dec. 15, 1958 3 Sheets-Sheet 2

INVENTOR.
WILLIAM C. WETZEL
BY
ATTORNEYS

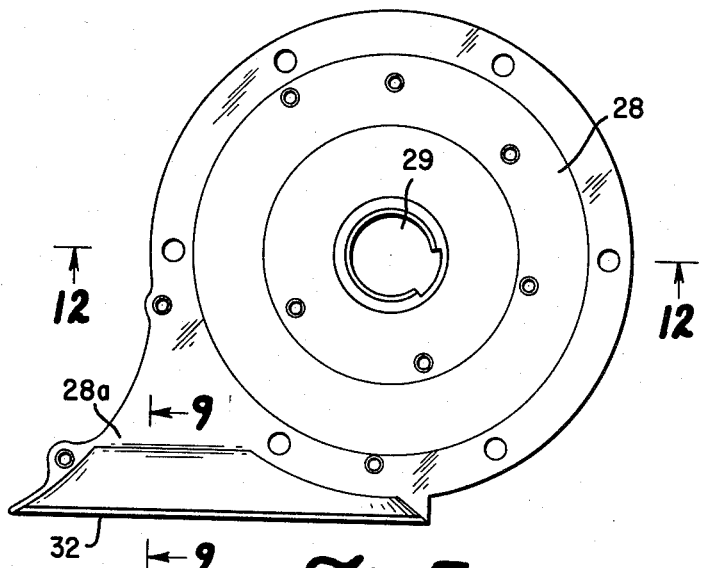
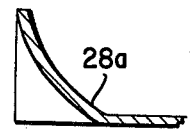
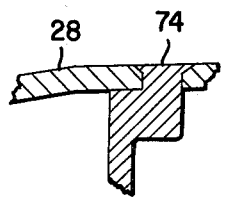
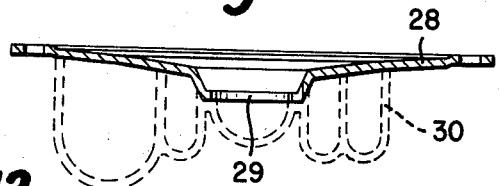
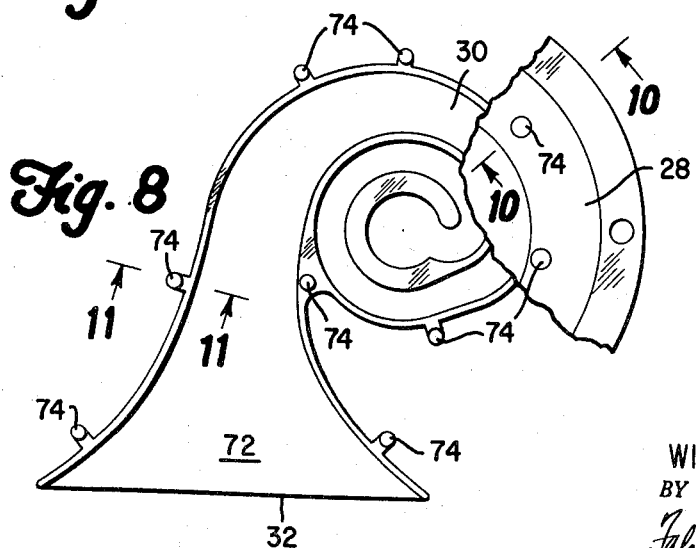
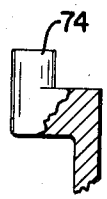

United States Patent Office 2,942,255
Patented June 21, 1960

2,942,255

HORN FRAME CONSTRUCTION

William C. Wetzel, 260 State Park Drive, Bay City, Mich.

Filed Dec. 15, 1958, Ser. No. 780,335

5 Claims. (Cl. 340—388)

This invention relates to horns more particularly to signalling horns such as used on automotive vehicles, and to the methods of manufacturing them.

The present invention is concerned with the simplification of the horn construction to bring about economics in the manufacture of the horn, both by a saving of material used in the construction of the horn and by a simplification of the operations in the manufacture of the horn on the mass production line.

It is therefore a principal object of this invention to simplify the horn structure to make it more suitable and cheaper to make on a mass production line.

It is a further object of this invention to provide a single base member which is conformed in such a manner that the main elements of the horn are formed integrally therewith to provide a means whereby the horn cost in a mass production line is materially reduced.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

Fig. 7 is a plan view of the trumpet.

Fig. 8 is a plan view of a trumpet portion taken along line 8—8 of Fig. 3.

Fig. 9 is an elevational view of a detail taken along line 9—9 of Fig. 7.

Fig. 10 is an elevational view of a detail taken along line 10—10 of Fig. 8.

Fig. 11 is an elevational view of a detail taken along line 11—11 of Fig. 8 and

Fig. 12 is an elevational view taken along line 12—12 of Fig. 7,

Figure 1:
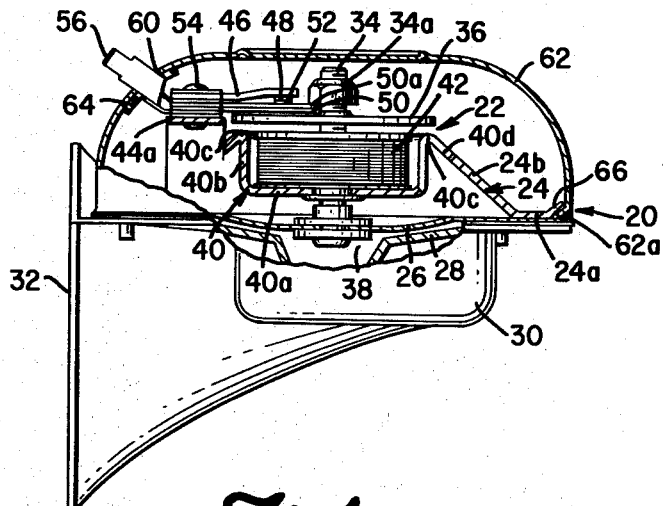
Fig. 1 is an elevational view partly in section of a horn incorporating the invention.

Referring to the drawings particularly to Fig. 1, an electromagnetic horn 20 is shown of the so-called "air horn" type which when operated creates a clear melodious note based upon the resonance of an air column in a trumpet of the "sea shell" type. The horn includes an electromagnetic motor 22 which is supported by an integral frame member 24, which also supports a vibratory diaphragm 26 cooperating with a face plate 28. On the lower side of the face plate 28 an air trumpet 30 is provided which cooperates with the face plate to provide a resonating air column terminating in a bell 32 also formed by cooperating portions of the two connected parts. The melodious note of the horn is created by the resonance in the air column which is excited by the vibrations of the diaphragm 26 when driven by the connecting rod 34 attached at a central location to both the diaphragm 26 and the armature 36 of the electromagnetic motor 22. The movement of the diaphragm 26 during its vibratory period collapses and expands an air chamber 38 formed between the diaphragm and the face plate to create compressions and rarefactions in the air column to which the air chamber is connected to cause resonance in the air column to create the desired musical note from the horn. The basic concept of the air horn has been known and used for many years and does not form a part of the invention, which is concerned with a novel simplification of the component parts to provide a horn construction which is suitable for mass production at a much lower cost than has been heretofore possible.

Figure 6:
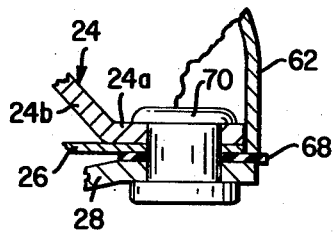
Fig. 6 is an elevational view of a detail taken along line 6—6 of Fig. 2.

The frame member 24 which is the principal supporting element or portion is stamped from a single sheet of magnetic material preferably steel with either progressive or transfer tooling. The frame member consists of a member of integral elements conformed to support the operating elements of the horn. On its periphery, the frame member is provided with a flange portion 24a which is disposed in a single plane to support on its lower side the vibratory diaphragm as shown in Fig. 6. The inner side of the flange portion 24a is connected to a conical section 24b which rises out of the plane of the flange portion on the side opposite from the diaphragm as seen best in Figs. 1, 4 and 5. The conical section is disposed concentrically with the flange portion and is truncated to form a reentrant cup-shaped portion 40 which is provided with a bottom 40a, a vertical side portion 40b and a lip 40c all of which are integral with the conical section 24b. The cup-shaped reentrant portion 40 seats an electromagnetic actuating coil 42 of the electromagnetic motor 22, the bottom 40a, the vertical side 40b, and the lip providing a magnetic circuit for the coil 42. The vertical side is preferably perforated by three cut-outs 40d, which reduce losses arising from eddy currents when the electromagnetic motor is operating, which might unduly heat the motor elements.

The coil 42 is preferably wound on a bobbin formed by a central hollow core of steel with staked heads, the bottom head being preferably formed of steel to reduce magnetic reluctance of the flux circuit. The coil assembly is attached to the bottom 40a of the cup-shaped portion at a central location and is staked permanently in fixed position as shown in Fig. 1. The central aperture 42a of the coil assembly is concentric with the lip 40c and provides a free passageway for the diaphragm stud 34 which is attached at the center of the diaphragm 26 in any convenient manner and has affixed to it by a threaded relation the armature member 36. When the air gap between the armature 36 and the lip 40c is suitably adjusted by changing the position of the armature at the threaded portion, the armature is staked to fix it permanently in position on the stud.

Figure 2:
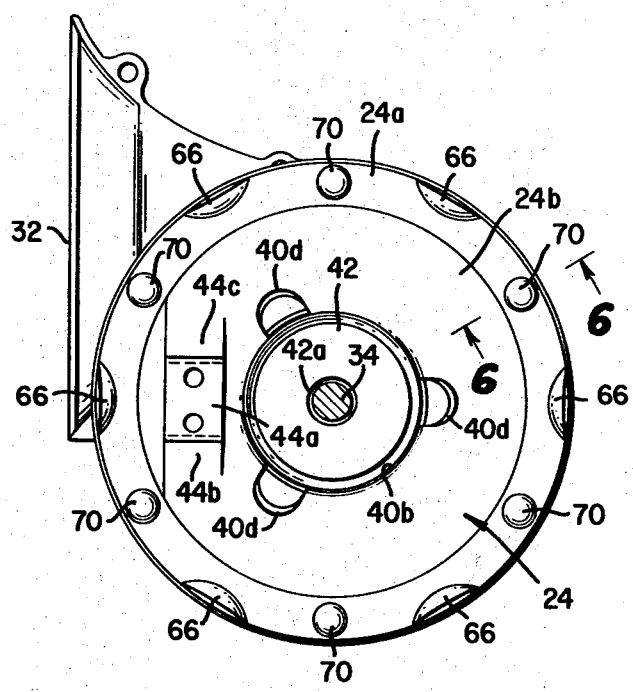
Fig. 2 is a plan view with some of the operating parts removed.
Figure 4:
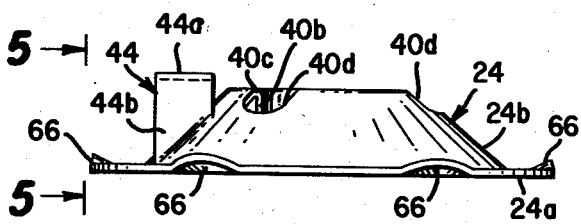
Fig. 4 is an elevational view of the frame member of the horn.
Figure 5:
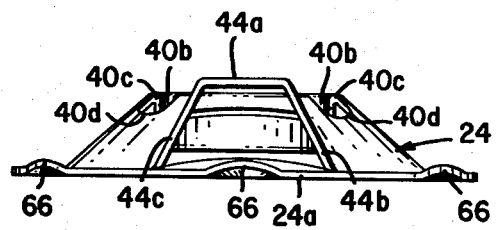
Fig. 5 is an elevational view taken along the line 5—5 of Fig. 4.

Returning now to the frame member 24 and referring to Figs. 4 and 5, the conical section 24b on one side is cut and conformed to provide an integral bridge member 44, which supports the circuit breaker elements for the electromagnetic motor. The bridge member consists of a three sided box-like construction having an upper platform element 44a, which is disposed in a chordal relation with the conical section 24b and the flange portion 24a as is best seen in Fig. 2, being disposed a little above the lip 40c of the reentrant portion as best seen in Fig. 5. The platform element is supported by integral side members 44b and 44c, which are obliquely disposed in divergent relation with the platform element to join integrally with the adjacent portions of the conical section, also best seen in Fig. 5. This forms a rigid construction for supporting the circuit breaker elements, which consist of a rigid upper arm 46 carrying a fixed contact 48 on its lower side, and a flexible spring element 50 carrying a movable contact 52 on its upper side so that it cooperates with the fixed contact 48 as seen in Fig. 1. The spring element 50 is covered on its upper side by an insulating strip 50a having an opening through which the contact 52 projects to cooperate with the fixed contact 48, the spring element and its insulating strip being sufficiently long to extend from the platform element 44a, to which both the arm and spring elements 46 and 50 are attached by rivets 54, to a cooperative relation with the diaphragm stud 34, which is provided with a locknut 34a to overlie the ends of the spring element 50 and its insulating strip 50a. This provides a means whereby the downward movement of the diaphragm-armature assembly, when attracted by the magnetic field of the coil 42, will open the contact points 48 and 52 to break the electric circuit through the coil 42 to create the vibratory action for the diaphragm, as is well known in the art.

Figure 3:
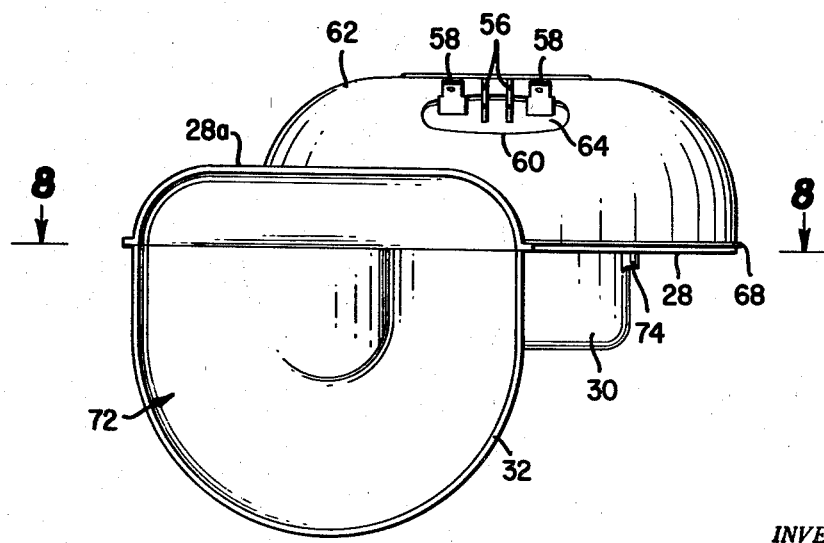
Fig. 3 is an elevational view of the horn looking into the trumpet.

In order to further reduce the number of parts necessary to fabricate the circuit breaker, the insulating strip 50a is formed in a T-shaped conformation to cooperate with the stack attached by the rivets 54 to the platform element 44a. The same applies to the terminal elements 56 and 58, which extend from the opposite side of the stack at an angular upwardly projecting relation to extend outwardly through an aperture 60 in the casing or cover 62, as best seen in Figs. 1 and 3. A soft rubber gasket member 64 is provided to seal the horn elements under the cover 62 from the action of the elements and atmospheric conditions. Either two or four terminal elements may be used, depending upon conditions, being disposed in transverse relation in pairs as shown to cooperate with a terminal connecting block (not shown). The terminal elements are in electrical circuit with the coil 42 and the fixed and movable contacts 48 and 52, as is well known in the art to create the vibratory conditions in the diaphragm 26 by power derived from the electromagnetic motor 22, with either an internal or external ground, as found convenient.

The dome 62, which is preferably a deep-drawn metal cup, is attached to the periphery of the flange portion 24a of the frame member 24 by providing symmetrically spaced protuberances 66, which extend obliquely upwardly from the flange portion to provide a small clearance under which the adjacent edge portions 62a of the casing are staked to hold the dome in place on the frame member. In the event different spatial relations between the terminals and the trumpet flare 32 are desired, the relations of the parts can be varied to suit the conditions, which usually arise with reference to the mounting of the horn on an automobile, without requiring changes in fundamental structural arrangements of the components. One dome may therefore be utilized, including its attaching elements, on several different mounting relations of the other parts of the horn, which is a distinct advantage when mass production is considered.

The elasticity of the peripheral edge of the casing 62 and the spaced relation of the protuberances 66 allow disengagement of the dome or casing and then replacement after a motor adjustment is made, without prejudicing the efficiency of the dome attachment to the frame member. Referring to Fig. 6, it will be noted that the face plate 28, and its annular face gasket 68, extend slightly beyond the diameter of the flange portion 24a of the frame member to form a ledge on which the lower edge of the dome 62 rests when it is in locked position on the frame member. These elements are held together by symmetrically disposed rivets 70, as best seen in Fig. 2.

The face plate 28 is also preferably made from a sheet metal stamping, as shown in Figs. 7 and 9, being generally circular in form and provided with a lateral extension 28a, which is flaring in shape to form the upper portion of the bell of the horn trumpet, as best seen in Figs. 3 and 9. It is also provided with a central aperture 29. The upper side of the face plate cooperates with the diaphragm 26 and thus forms the fixed wall of the collapsing air chamber 38 during the vibratory period of the diaphragm. On the lower side of the face plate 28, the air trumpet 30 is found formed from a "sea-shell" die casting 72 which is attached thereto to form the enclosure for the resonating air column. The casting is provided with integral rivet-like members 74 positioned on offset ears at spaced points which cooperate with aligning apertures in the face plate 28 (Figs. 8, 10 and 11) into which they are riveted to hold the parts together in operative position as shown in Figs. 3 and 10. A sealing adhesive is positioned between the parts to create an air-tight seal between them. The chamber formed between the face plate 28, and the sea-shell casting is of a length suited to resonate at the fundamental frequency of vibration of the diaphragm 26, being excited by the compression and rarefactions of the air in the collapsible chamber 38 with which it is in communication at a central location at the aperture 29 at the inner end of the air column. If desired, the air trumpet member 30 may also be formed of a molded plastic member, using a formulation which has the requisite strength and impact resistance.

It is to be understood that the above-detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a horn with a collapsible air chamber, a resonating air column and a trumpet flare, the air column and trumpet consisting of a pair of cooperating members attached together, a first member of said pair comprising a stamping from sheet metal which on one side forms a fixed portion of the collapsing air chamber and on its other side forms a relatively flat side for the resonating air column with which the chamber is in communication through a central aperture in said first member, said first member also having a lateral projection which is arched to form a portion of the trumpet flare, and a second member of said pair comprising a casting having an arched open portion in spiral connected relation to form the air column when attached to the first member, said second member also having an enlarged flaring portion to cooperate with the lateral projection of the first member to form a flare for the trumpet of the resonating air column.

2. In a horn construction, an integral frame member for supporting the horn elements stamped from a sheet of magnetic material including a perimetrical flange portion positioned in a single plane, a vibratile diaphragm attached to said flange portion against one side thereof, an integral conical section on the frame member positioned inside of the flange portion extending in a direction opposite from the diaphragm, an integral reentrant portion truncating the conical section to form a cup-shaped depression extending toward the diaphragm, the lip and the bottom of the depression being in spaced parallel relation with the flange portion, an electromagnetic coil positioned in the depression below the lip thereof, an integral portion on the frame member on the exterior of the depression positioned in a chordal relation with the flange portion in the conical section to provide a platform in parallel spaced relation to the flange portion, said platform being positioned above the lip of the depression, an armature assembly connected to said diaphragm cooperating with said lip to vibrate the diaphragm by the attraction of the electromagnetic coil, and a circuit breaker assembly affixed to the platform to cooperate with the armature to open the circuit through the electromagnetic coil to vibrate the armature and diaphragm.

3. In a horn construction, an integral frame member for supporting the horn elements stamped from a sheet of magnetic material including a perimetrical flange portion positioned in a single plane, a vibratile diaphragm including an armature attached to said flange portion against one side thereof, an integral conical section on the frame member positioned inside of the flange portion extending in a direction opposite from the diaphragm, an integral reentrant portion truncating the conical section to form a cup-shaped depression extending toward the diaphragm, the lip and the bottom of the depression being in spaced parallel relation with the flange portion, an electromagnetic coil positioned in the depression below the lip thereof said lip and armature cooperating together in a magnetic relation, a bridge portion integral with the frame member on the exterior of the depression positioned in a chordal relation with the flange portion adjacent the conical section to provide a platform in parallel spaced relation to the flange portion, said platform being positioned above the lip of the depression, and a circuit breaker assembly anchored on said platform and cooperating with said armature whereby the circuit breaker will be actuated by the vibration of the diaphragm by the attraction of the electromagnetic coil for the armature to open the circuit through the electromagnetic coil.

4. In a horn construction, an integral frame member for supporting elements stamped from a sheet of magnetic material including an external flange portion positioned in a single plane, a vibratile diaphragm attached to said flange portion against one side thereof, an integral conical section on the frame member positioned inside of the flange portion extending in a direction opposite from the diaphragm, a reentrant portion extending toward the diaphragm truncating the conical section to form a cup-shaped depression, the lip and the bottom of the depression being in spaced parallel relation with the flange portion, an electromagnetic coil positioned in the depression below the lip thereof, an armature attached to the diaphragm in spaced parallel relation with the lip, a bridge portion integral with the frame member positioned in a chordal relation with the flange portion in the conical section to provide a platform in parallel spaced relation to the flange portion, said platform being positioned above the lip of the depression, a circuit breaker assembly anchored on said platform and cooperating with said diaphragm whereby vibration of the diaphragm by the magnetic attraction of the electromagnetic coil for the armature will actuate the circuit breaker to open the circuit through the electromagnetic coil.

5. In a horn construction, an integral frame member for supporting the horn elements stamped from a sheet of magnetic material including a flange portion having raised protuberances on its perimeter, a vibratile diaphragm attached to said flange portion against one side thereof, an integral conical section on the frame member positioned inside of the flange portion extending in a direction opposite from the diaphragm, a slotted reentrant portion truncating the conical section to form a cup-shaped depression extending toward the diaphragm, the lip portions formed by the slots and the bottom of the depression being in spaced parallel relation with the flange portion, an electromagnetic coil positioned in the depression below the lip portions thereof, an armature disc affixed to the diaphragm and cooperating with the lip portions, a bridge portion in the conical section integral with the frame member positioned in a chordal relation with the flange portion to provide a platform in parallel spaced relation to the flange portion, said platform being positioned above the lip of the depression and the armature disc, a circuit breaker anchored on said platform and connected to said diaphragm whereby vibration of the diaphragm by the attraction of the electromagnetic coil for the armature disc will actuate the circuit breaker to open the circuit through the electromagnetic coil, and a dome-shaped cover having struck-in portions on its lip to engage the protuberances on the perimeter of the flange portion to hold the cover in position on the flange portion to enclose the horn elements.

References Cited in the file of this patent

UNITED STATES PATENTS

| 2,326,421 | White | Aug. 10, 1943 |
| 2,803,004 | White | Aug. 13, 1957 |

FOREIGN PATENTS

| 26,486 | Netherlands | Apr. 15, 1912 |